(12) United States Patent
Auffret et al.

(10) Patent No.: US 8,302,400 B2
(45) Date of Patent: Nov. 6, 2012

(54) INTERNAL COMBUSTION ENGINE COMPRISING AN EXHAUST GAS RECIRCULATION SYSTEM

(75) Inventors: Nicolas Auffret, Lyons (FR); Nicolas Dronniou, Versailles (FR)

(73) Assignee: Renault Trucks, St. Priest (FR)

( * ) Notice: Subject to any disclaimer, the term of this patent is extended or adjusted under 35 U.S.C. 154(b) by 451 days.

(21) Appl. No.: 12/514,804

(22) PCT Filed: Nov. 8, 2007

(86) PCT No.: PCT/IB2007/004262
§ 371 (c)(1), (2), (4) Date: May 14, 2009

(87) PCT Pub. No.: WO2008/062315
PCT Pub. Date: May 29, 2008

(65) Prior Publication Data
US 2010/0064685 A1 Mar. 18, 2010

(30) Foreign Application Priority Data
Nov. 23, 2006 (WO) .................. PCT/IB2006/004061

(51) Int. Cl.
*F02B 33/44* (2006.01)
(52) U.S. Cl. ........................................ 60/605.2; 60/612
(58) Field of Classification Search ...................... 60/612, 60/605.2
See application file for complete search history.

(56) References Cited

U.S. PATENT DOCUMENTS

| | | | |
|---|---|---|---|
| 5,791,146 A | 8/1998 | Dungner | |
| 6,230,683 B1 * | 5/2001 | zur Loye et al. | 123/435 |
| 6,324,846 B1 * | 12/2001 | Clarke | 60/605.2 |
| 6,360,732 B1 * | 3/2002 | Bailey et al. | 60/612 |
| 6,973,787 B2 * | 12/2005 | Klingel | 60/612 |
| 7,165,403 B2 * | 1/2007 | Sun et al. | 60/612 |
| 7,571,608 B2 * | 8/2009 | Boyapati et al. | 60/612 |
| 2007/0175215 A1 * | 8/2007 | Rowells | 60/605.2 |

FOREIGN PATENT DOCUMENTS

| | | |
|---|---|---|
| EP | 0740065 A | 10/1996 |
| JP | 11062715 A | 3/1999 |
| JP | 2000008963 A | 1/2000 |
| JP | 2001073884 A | 3/2001 |

OTHER PUBLICATIONS

International Preliminary Report on Patentability for corresponding International Application PCT/IB2007004262.
International Search Report for corresponding International Application PCT/IB2006/004061.

* cited by examiner

*Primary Examiner* — Quyen Leung
*Assistant Examiner* — Thomas Truong
(74) *Attorney, Agent, or Firm* — WRB-IP LLP

(57) ABSTRACT

An internal combustion engine includes a plurality of cylinders, an air intake line and an exhaust line collecting exhaust gas. The engine also includes an EGR line for rerouting a part of the exhaust gas from the exhaust line towards the air intake line and at least a first turbocharger comprising a first turbine driven by the exhaust gas flowing towards the atmosphere, linked to a first compressor located on the air intake line. The engine further includes a variable geometry EGR turbine located on the EGR line, driven by the EGR gas flowing in the EGR line. Thus, thanks to the pressure reduction occurring in the turbine, the EGR gas temperature is lowered, and less cooling power from the engine cooling system is required to cool down the EGR.

14 Claims, 5 Drawing Sheets

INTERNAL COMBUSTION ENGINE COMPRISING AN EXHAUST GAS RECIRCULATION SYSTEM

BACKGROUND AND SUMMARY

The present invention relates to an internal combustion engine comprising an exhaust gas recirculation system, especially an internal combustion engine dedicated to personal vehicles or industrial applications, such as industrial vehicles or machines.

In many countries, environmental regulations impose an upper limit in engine NOx (nitrogen oxide and nitrogen dioxide) emissions, and in future regulations, this limit will again be reduced.

One of the conventional ways of decreasing the level of NOx emissions in internal combustion engines is to recirculate a portion of the exhaust gas back to the engine cylinders. This results in lowering the combustion temperature and oxygen concentration and, as a consequence, limits NOx generation as NOx is generated by oxygen and high temperature. Cooling the exhaust gas recirculation (EGR) gas before reintroduction into the engine further reduces NOx emissions as this allows the introduction into the cylinders of a greater mass of exhaust gas and increases mixture heat capacity.

To meet the current regulations, a typical internal combustion engine can comprise as depicted on FIG. 1:
- an air intake line 100 carrying intake air towards at least one engine intake manifold 101 connected to each cylinder 102, said air intake line 100 including an upstream low pressure compressor 103 and a downstream high pressure compressor 104 as well as an heat exchanger 105 (using the coolant of the engine cooling system) located between the high pressure compressor and the intake manifold 101;
- an exhaust line 106 having at least one exhaust manifold 107 collecting the exhaust gas formed in each cylinder 102; said exhaust line 106 can include two turbines 108, 109 driven by the exhaust gas flowing from the exhaust manifold 107, each turbine being mechanically connected to one of the compressors 103, 104;
- an exhaust gas recirculation (EGR) line 110 whose inlet is connected to the exhaust line 106 and whose outlet comes out in an EGR mixer 111 connected to the air intake line 100, before the intake manifold 101 and after the intake cooler 105, whereby part of the exhaust gas is mixed with intake air and then reintroduced into the engine cylinders 102.

A control valve 113 also referred to as EGR valve regulates the flow of exhaust gas rerouted from the exhaust manifold 107 into the intake manifold 101.

In such a known engine, the EGR gas is cooled before entering the cylinders 102 by means of an EGR cooler 112 located in the EGR line 110; this cooler 112 is usually an air/water heat exchanger using the coolant of the engine cooling system.

Consequently, the heat transferred from the hot exhaust gas to the coolant can be significant, which can be detrimental to the cooling capacity of the vehicle cooling system.

Tighter NOx emission regulations will therefore result in vehicle cooling systems needing more cooling power. Therefore, coolant pump design could be problematic, and fuel consumption could be significantly increased as cooling fans may have to be engaged more often to meet the extra cooling need.

Another technical issue that has to be taken into account is the engine pressure differential. In order words, for the EGR gas to be able to flow from the exhaust manifold to the intake manifold, the engine pressure differential (which is the difference between exhaust pressure and intake pressure, i.e. dP=Pexhaust−Pintake) must be positive and significant enough. However, under specific engine operating conditions, exhaust backpressure can be lower than intake pressure (i.e. dP is negative) or not high enough. This generally occurs at low engine speeds or low loads. Consequently, under these engine operating conditions, no or too little EGR gas is rerouted into the intake manifold, and therefore NOx emissions cannot be reduced under the level imposed by regulations. This positive exhaust to intake pressure difference will also affect engine efficiency and increase fuel consumption.

WO 01/14707 tackles the problem of EGR gas cooling and of engine cooling system overload. Under the teaching of this document, the EGR cooler has to be oversized, as EGR gas flowing from this EGR cooler goes through a compressor and then is reintroduced into the intake manifold without further cooling.

Moreover, since a single turbine is provided on the exhaust line to drive two compressors, namely an intake air compressor and an EGR gas compressor, the engine thermodynamic efficiency is not optimized.

Another engine provided with an EGR system is described in WO 98/35153. According to this document, EGR gas flows through a radiator, and then through a compressor before it is reintroduced into the intake manifold. Consequently, the EGR gas temperature increase taking place in the EGR compressor can be compensated by a prior temperature reduction in the radiator, in which the EGR gas cooling is achieved by air flow.

While this arrangement is profitable since it does not entail an overload of the engine cooling system, on the other hand it has several other drawbacks.

In particular, in order to achieve a sufficient decrease in EGR gas temperature, the radiator must be large enough, and located in a sufficiently open space to allow air to flow around it. However, a vehicle has a complex structure which includes a large number of components (engine, cooling system, suspension system, transmission system, hydraulic system etc.) which are very tightly arranged so as to minimize the overall size of the vehicle. The consequence is that the space dedicated to accommodate the radiator can be severely limited.

More generally, the engine arrangement described in WO 98/35153 involves many conduits, and consequently many associated components such as valves, etc. In addition to being complex, such a structure also lacks compactness.

JP-2001073884 discloses a turbocharged engine arrangement where the turbocharger is equipped with a waste gate to relieve the turbocharger when too much exhaust gases flow out of the engine. The waste gate ejects excess gases in a line which is connected to the intake manifold, so that these gases are re-circulated. This line, which is branched-off the waste-gate of the turbocharger, therefore forms a kind of EGR line, but it has the disadvantage that the EGR flow is directly linked to the amount of gas discharged from the waste-gate. Therefore, it is not possible to control independently the flow of gases through the turbine of the turbocharger and the flow of EGR. Therefore, for certain operating conditions, it is not possible to fully optimize the engine's operation.

It therefore appears that there is room for improvement in the exhaust gas recirculation system in internal combustion engines.

It is an desirable to provide an improved internal combustion engine equipped with an exhaust gas recirculation system, which can overcome the drawbacks encountered in current engines.

It is desirable to provide an engine where EGR gas can be cooled enough without overloading the engine cooling system.

It is also desirable to provide an engine with a better thermodynamic efficiency.

Thus, the present invention provides, according to an aspect thereof, an internal combustion engine that comprises a plurality of cylinders, an air intake line capable of carrying intake air towards an engine intake manifold and an exhaust line capable of collecting exhaust gas from an exhaust manifold. The internal combustion engine also comprises an EGR line capable of rerouting a part of the exhaust gas from the exhaust line towards the air intake line and at least a first turbocharger comprising a first turbine driven by the exhaust gas flowing towards the atmosphere, mechanically linked to a first compressor located on the air intake line. The internal combustion engine further comprises a turbine located on the EGR line driven by the EGR gas flowing in the EGR line. The EGR turbine is of the variable geometry type.

With this arrangement, EGR gas flowing from the exhaust manifold goes through the EGR turbine prior to entering the EGR cooler. Due to the pressure reduction occurring in the turbine, the EGR gas temperature is lowered, for example by as much as 100° C. Consequently, the EGR gas temperature at the EGR cooler inlet is lower than in the prior art engines. This makes it possible to reduce the load on the engine cooling system and to obtain a lower EGR gas temperature at the intake manifold inlet, which means an even more reduced NOx level in the exhaust gas. Moreover, to achieve this goal, the invention does not require a large and cumbersome radiator. It has to be noticed that, even if an air to water heat exchanger is still present in the engine to cool EGR gas, the heat rejection to the engine cooling system is however lowered thanks to the invention, since the expansion through the EGR turbine makes it possible to save a significant part of the vehicle cooling capacity. The fact that the EGR turbine is of the variable geometry type allows an optimal control of the EGR gas temperature and pressure reductions through the EGR turbine. Indeed, the flow of EGR gas can thus be regulated by varying the geometry of the turbine. Indeed, a direct effect of varying the turbine geometry is to vary the pressure drop of the flow of EGR gases through the EGR turbine, which influences the flow of gases in the EGR circuit compared to flow of gas in the main exhaust line.

The EGR turbine being located on the EGR line is solely driven by EGR gas rerouted into the intake manifold, the EGR turbine is not driven by exhaust gas flowing towards the atmosphere. In other words, the EGR turbine is an EGR dedicated turbine, arranged in parallel with the first turbine of the first turbocharger; all the flow passing through the EGR turbine is fed to the air intake line.

The EGR turbine being of the variable geometry type, no additional flow regulating valve needs to be provided in the EGR line upstream of the EGR turbine. This not only simplifies the construction and the control of the engine arrangement, but it also allows to optimize both the flow of EGR and the EGR turbine operation in a combined way, achieving optimum efficiency of the system.

According to a preferred implementation of the invention, the internal combustion engine further comprises an energy recovering means linked to the EGR turbine and capable of recovering the energy provided by the EGR turbine.

This important arrangement of the engine makes it possible to recover the energy produced by the EGR turbine in an appropriate energy recovering means, which can directly use this energy or store it for future use. Consequently, thanks to this implementation of the invention, on top of a better EGR temperature decrease, a better engine thermodynamic efficiency can be achieved.

Preferably, the EGR line outlet is connected to the air intake line upstream from at least one compressor.

In that way, the invention makes it possible to manage engine air pressure differential dP, since the compressor forces EGR gas to flow towards the intake manifold even at engine operating conditions when dP would be opposite or favourable but too low. Therefore, the engine back pressure is significantly limited: EGR gas will naturally flow from a high pressure source to a low pressure source and fuel consumption can be improved. Because there always exists an EGR gas recirculation, engine NOx emissions can be effectively reduced under the imposed level, whatever the engine operating conditions.

According to a first embodiment of the invention, the energy recovering means is a second compressor mechanically connected to the EGR turbine and capable of compressing gas flowing from the first compressor outlet towards the intake manifold.

In this embodiment, the engine comprises two turbochargers whose turbine, driven by exhaust gas or EGR gas, provides energy for compressing intake air or a mix of intake air and EGR gas. The gas flowing in the air intake line towards the intake manifold can then pass through a two-stage turbocharger. This arrangement may be implemented in order to provide an intake pressure which is high enough to create a favourable engine pressure differential.

The second compressor can be located on the air intake line, downstream from the first compressor. When needed, the air intake line may further comprise an additional compressor located downstream from the first compressor. This additional compressor is preferably situated between the first and the second compressors, and may be part of an additional turbocharger, the turbine of which being located on the exhaust line upstream from the first turbine.

Alternatively, the second compressor is arranged in parallel with an additional compressor located on the air intake line downstream from the first compressor.

According to a second embodiment of the invention, the energy recovering means may be an energy storage component (such as a battery), a crankshaft mechanically or electrically connected to the EGR turbine, or an electrical device connected to the EGR turbine (such as an electric motor or an alternator).

This second embodiment can be implemented when no compressor linked to the EGR turbine is required on the air intake line to obtain a satisfactory engine pressure differential. Consequently, the energy provided by the EGR turbine can either be directly used by another energy recovering means, or stored in an energy recovering means for a future use or for a use by another device located farther.

According to a third embodiment of the invention, the variable geometry EGR turbine is linked to a shaft of the at least first turbocharger said shaft connecting the first turbine and the first compressor. In other words, this embodiment of the invention incorporates a single compressor which is driven by two turbines namely an EGR turbine driven by EGR gas and a turbocharger turbine driven by engine exhaust gas. In this embodiment of the invention, the energy that is recovered on the EGR turbine is added to the energy that is recovered by the turbine of the engine turbocharger. The fact that at least the EGR turbine is of the variable geometry type allows to operate both turbines at optimum operating conditions, despite the fact that their rotation speed is not independent while operating under possibly different and varying gas flows.

In order to increase the intake pressure, the air intake line may further comprise an additional compressor located downstream from the first compressor. This additional compressor can be for example part of an additional turbocharger the turbine of which is driven by exhaust gas.

The EGR line outlet can be connected to the air intake line upstream from the only compressor or from the compressor located most upstream. This would result in a better mixing of EGR gas and intake air, and thus a better cooling of EGR gas since they may flow through more coolers and compressors. Additionally, if several compressors are provided, EGR gas pressure would also be higher, which favours NOx emission reduction.

Alternatively, the EGR line outlet can be connected to the air intake line downstream from the compressor located most upstream and upstream from at least one other compressor. With this disposition, the EGR pipes may be shorter, the engine being less expensive and more compact.

In an advantageous way, the exhaust manifold is arranged in two parts, each connected to a corresponding EGR pipe, the two EGR pipes meeting upstream from the first turbine. This prevents the EGR turbine from getting energy from only one part of the exhaust manifold, receiving only a few exhaust pulses, which would lead to an irregular driving of said turbine and to a poor efficiency.

Besides, the air intake line can further comprise at least one cooler located downstream from the EGR line outlet. This makes it possible to lower the EGR gas temperature in at least one cooler before it is reintroduced into the intake manifold.

For example, the air intake line can include:
an intake cooler located downstream from the compressor situated most downstream, and upstream from the intake manifold;
and/or at least one intake cooler located between two compressors when at least two compressors are present.

These and other advantages will become apparent upon reading the following description in view of the drawing attached hereto representing, as non-limiting examples, embodiments of an engine according to the invention.

DESCRIPTION OF FIGURES

The following detailed description of several embodiments of the invention is better understood when read in conjunction with the appended drawing being understood, however, that the invention is not limited to the specific embodiments disclosed. In the drawing.

DETAILED DESCRIPTION

Figure 1:
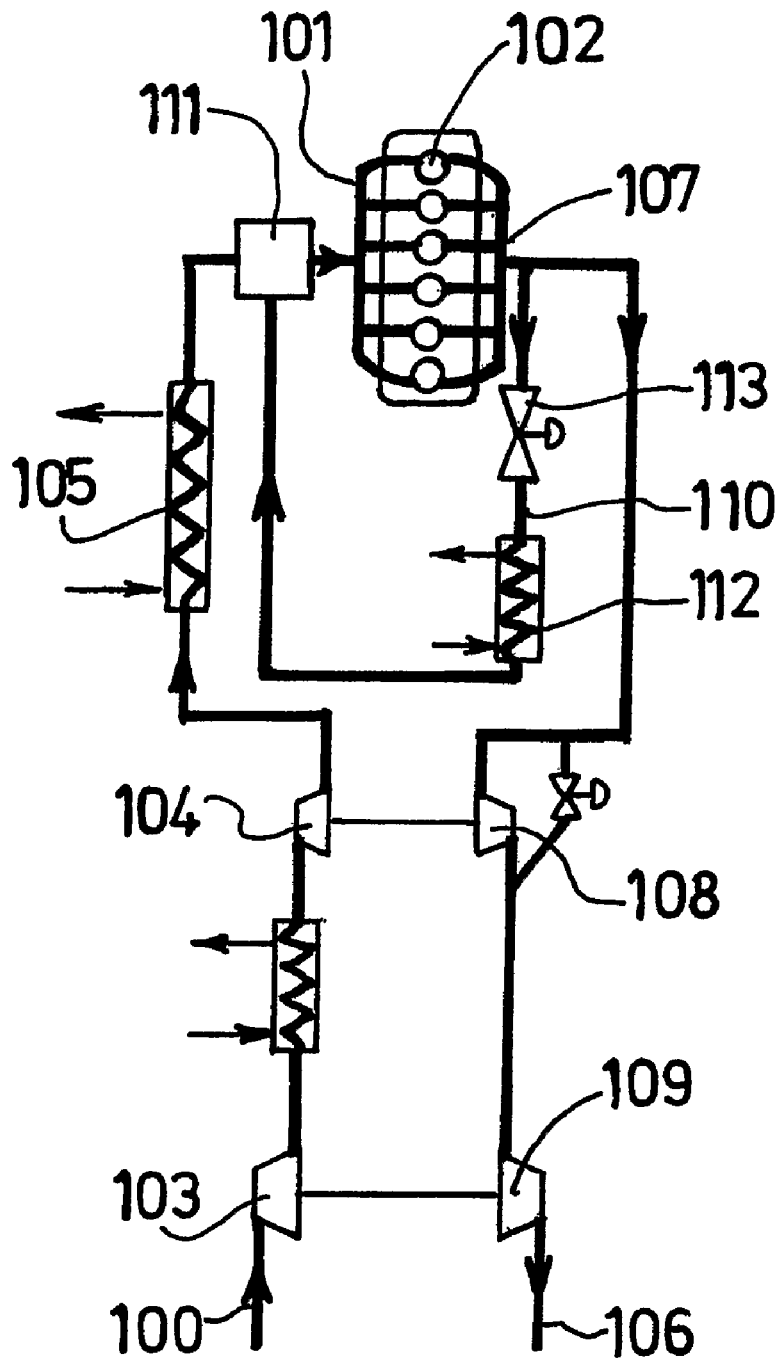
FIG. 1 is a schematic drawing of an internal combustion engine of the prior art.

An internal combustion engine 1 typically comprises an engine block 2 defining a plurality of cylinders 3, namely six cylinders in the embodiments illustrated in the figures. The number and arrangement of cylinders as illustrated in the drawings is of course purely indicative.

Intake air is carried towards an intake manifold 4 feeding the cylinders 3, through an air intake line 5. The gas formed in each cylinder 3 can be collected by an exhaust manifold 6 arranged in two halves. An exhaust line 7 connected to the exhaust manifold 6 carries one part of the gas (exhaust gas) towards the atmosphere. The other part of the gas (EGR gas) is carried by two circuits 8, 9, each connected to one half of the exhaust manifold 6. These circuits 8, 9 meet and form a single EGR line 12 whose outlet comes out in an EGR mixer 13 connected to the air intake line 5. In the shown embodiments, the EGR line is also provided with an EGR cooler 14 using the engine coolant, located downstream of the meeting point of conduits 8, 9.

The engine 1 can further include at least a first turbocharger. The first turbocharger can be a low pressure turbocharger having a turbine 15 located on the exhaust line 7, and a compressor 16 located on the air intake line 5. The engine 1 further comprises a second turbine which is a dedicated EGR turbine 17 located on the EGR line 12, downstream from the meeting point of conduits 8, 9 and upstream from the EGR cooler 14.

In the following, it is understood that the EGR turbine 17 is of the variable geometry type. Various types of variable geometry turbines are available on the market, usually incorporated in stand-alone turbocompressors.

As an examplen Honeywell Turbo Technologies offers Multivane™ Variable Geometry Turbochargers which employ a mobile system composed of a number of vanes that pivot on their axis to modify the cross section on the inlet of the turbine housing. An electronically controlled rotary electric actuator helps to channel gas to the turbine wheel, enabling precise control of boost pressure over a vast load and speed range. The VNT™ Slidevane™ Turbochargers models, also from Honeywell Turbo Technologies, employ a mobile nozzle piston system to modify the cross section. Cummins Turbo Technologies offers Holset VGT™ turbochargers in which the vanes do not pivot but slide axially. In the case of the VTG turbocharger from BorgWarner Turbo Systems, variable geometry is achieved using guide vanes located in front of the turbine wheel.

Thanks to the use of a variable geometry EGR turbine, it is possible to dispense with the usual EGR valve, or any other valve in the EGR line 7 upstream of the turbine, while still achieving optimal control of the flow of EGR gases, thus ensuring perfect match to the engine's instant operating parameters through the variation of the turbine geometry. At the same time, EGR turbine working conditions are also optimized.

Several embodiments of the invention will now be described; the same elements in each embodiment bear the same reference numerals.

Figure 2:
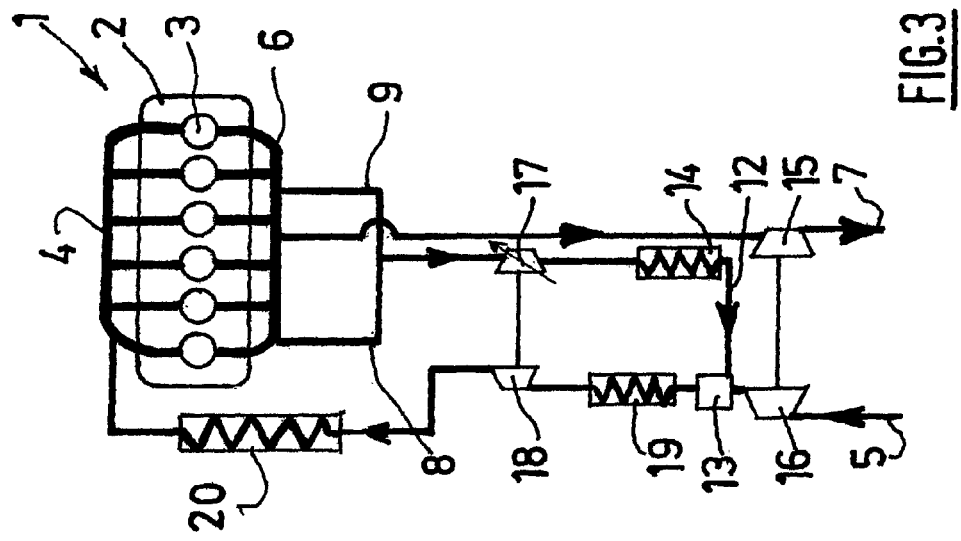
FIGS. 2-5 are schematic drawings of an internal combustion engine according to several variants of a first embodiment of the invention.
Figure 5:
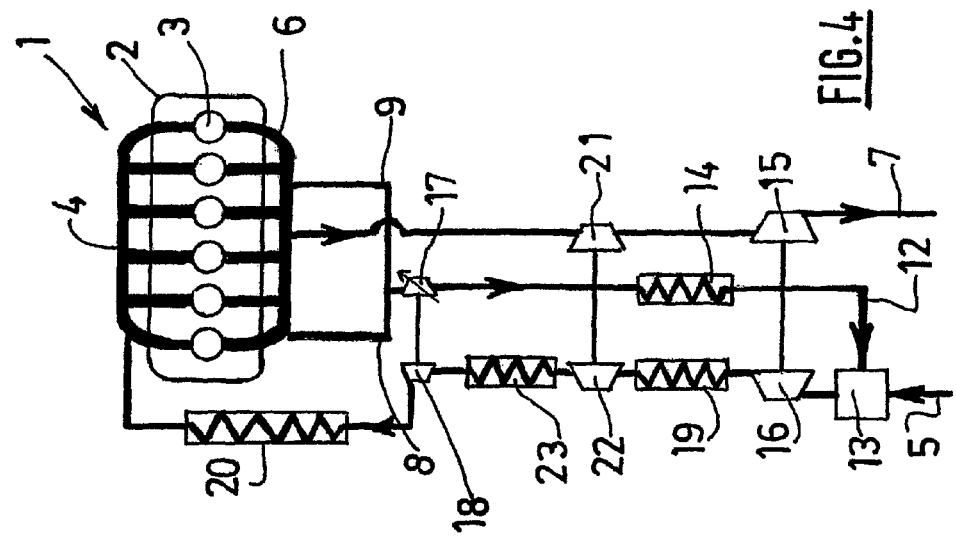

In a first embodiment of the invention, illustrated in FIGS. 2 5, the variable geometry EGR turbine 17 is part of a high pressure turbocharger, the compressor 18 of which is located on the air intake line 5 downstream from the low pressure compressor 16.

The air intake line 5 can be provided with a first intake cooler 19 located between low pressure compressor 16 and high pressure compressor 18, and with a second intake cooler 20 located downstream from the high pressure compressor 18 and upstream from the intake manifold 4. Both coolers 19, 20 can suitably use an engine coolant from the engine cooling system.

Figure 3:
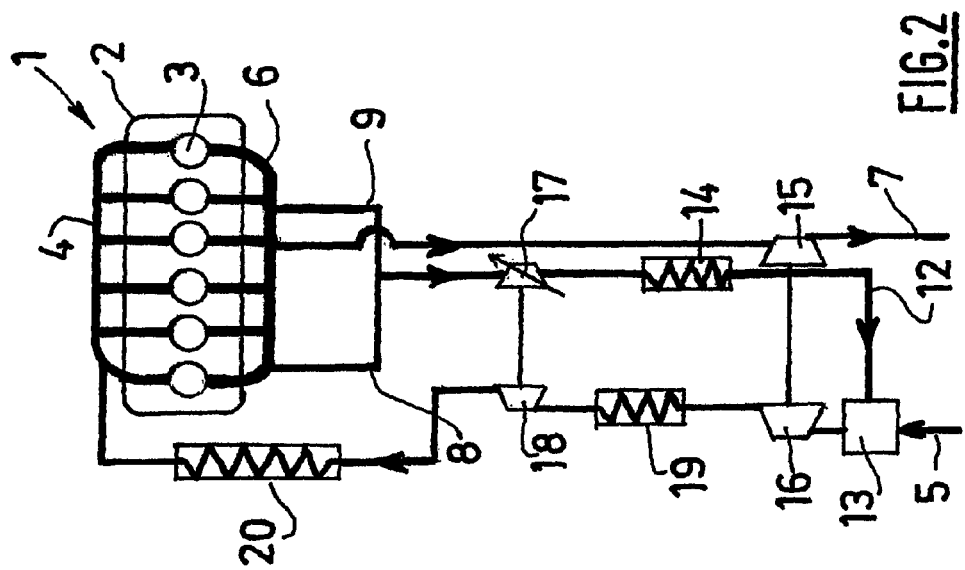

As depicted in FIGS. 2 and 3, the engine 1 is equipped with a two-stage turbocharger and, thus, a high boost pressure can be achieved.

In the embodiment described in connection with FIG. 2, the EGR mixer 13 is located upstream from low pressure compressor 16; intake air mixed with EGR gas flow through two coolers 19 and 20 and two compressors 16 and 18; this has the advantage of a better mixing between intake air and EGR gas, a better cooling of EGR gas and a higher gas pressure at the intake manifold 4. Another significant advantage is that it is possible to get high EGR rates even if boost pressure, i.e. intake pressure, is higher that exhaust pressure.

In the embodiment described in connection with FIG. 3, the EGR mixer 13 is located downstream from low pressure compressor 16 and upstream from first intake cooler 19. With this arrangement, the EGR circuit is shorter, and then more compact. And since EGR gas still flows through one compressor and two coolers, efficient mixing and cooling can be obtained, as well as a high enough intake pressure; it should also be noted that this embodiment has the further advantage of a good balance of the low pressure turbocharger as almost the same mass flow goes through the low pressure compressor 15 and through the low pressure turbine 16.

Figure 4:
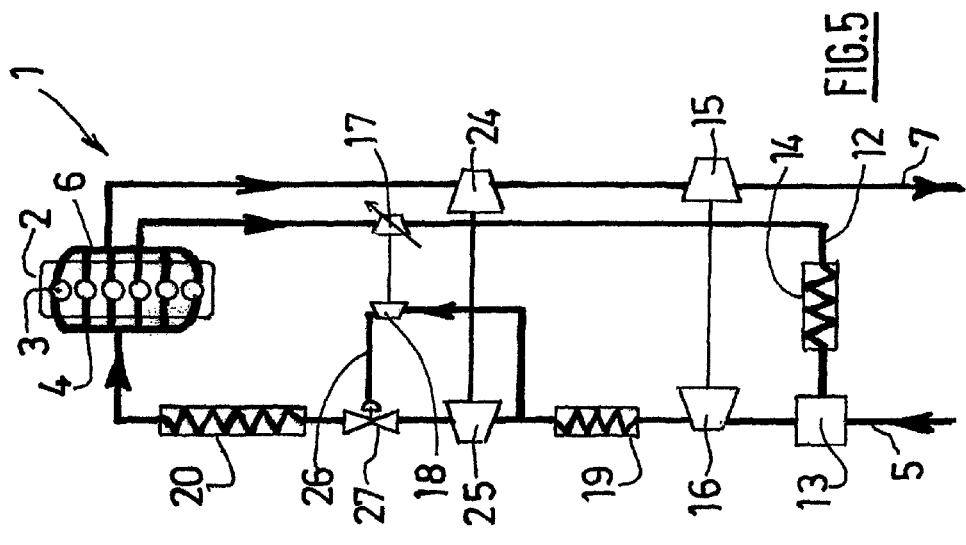

In the variant described in connection with FIG. 4, the engine 1 is equipped with a three-stage turbocharger, since an additional turbocharger is provided. This additional turbocharger comprises a turbine 21 located on the exhaust line 7 upstream from the turbine 15 of the low pressure turbocharger and a compressor 22 located on the air intake line 5 downstream from first intake cooler 19 and upstream from high pressure compressor 18. An additional cooler 23 can also be provided on the air intake line 5 between intermediate compressor 22 and high pressure compressor 18. In other words, the implementation of FIG. 4 corresponds to a conventional two-stage turbocharger architecture (with two turbines on the exhaust line and two compressors on the air intake line) with a third compressor linked to the EGR turbine, in order to increase the final boost pressure. The three compressors are connected in series.

In the variant of FIG. 5, there is also provided an additional turbocharger, comprising a turbine 24 located on the exhaust line 7 upstream from the turbine 15 of the low pressure turbocharger and a compressor 25 located on the air intake line 5, downstream of the low pressure compressor 16 and of the first intake cooler 19 and upstream from second intake cooler 20. However, the compressor 18 driven by the EGR variable geometry turbine is located on a parallel line 26 whose inlet is connected to the air intake line 5 upstream from high pressure compressor 25 and whose outlet is connected to air intake line 5, through a valve 27, downstream from intermediate compressor 25. A single direction flow valve 27 has to be used to prevent gas from the high pressure compressor 25 from flowing towards the compressor 18 outlet, which could generate surge. Compressors 25 and 18 are here set in parallel.

It has to be noticed that FIG. 5 shows no pipe meeting in EGR line 12, but an EGR line 12 whose inlet is connected to the exhaust manifold 6. However an arrangement with two conduits, as in FIG. 4, can be envisaged (not shown). A further arrangement could be to introduce the EGR mixer upstream of the low pressure compressor (not shown).

Figure 6:
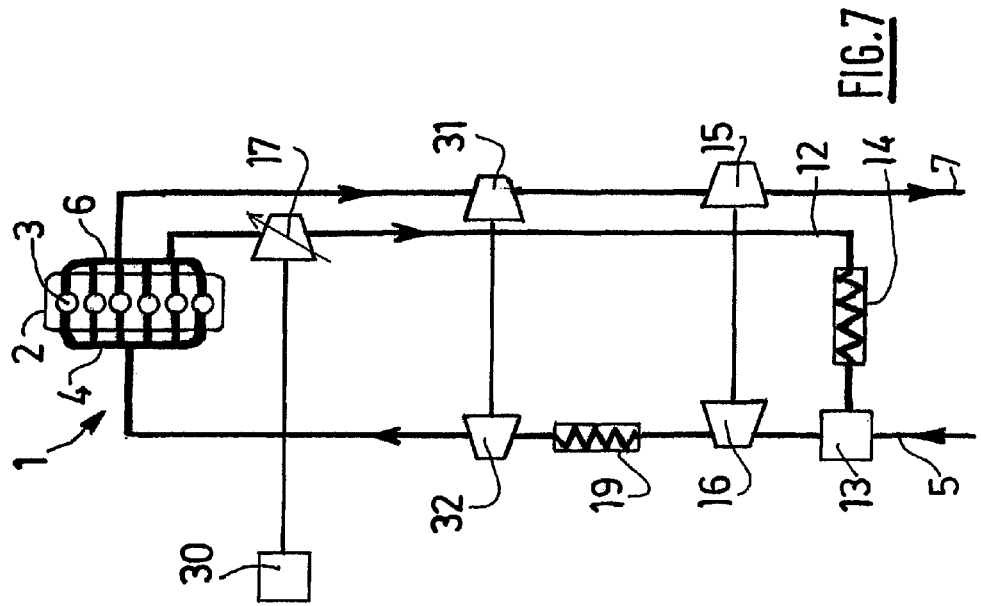
FIGS. 6 and 7 are schematic drawings of an internal combustion engine according to several variants of a second embodiment of the invention.
Figure 7:
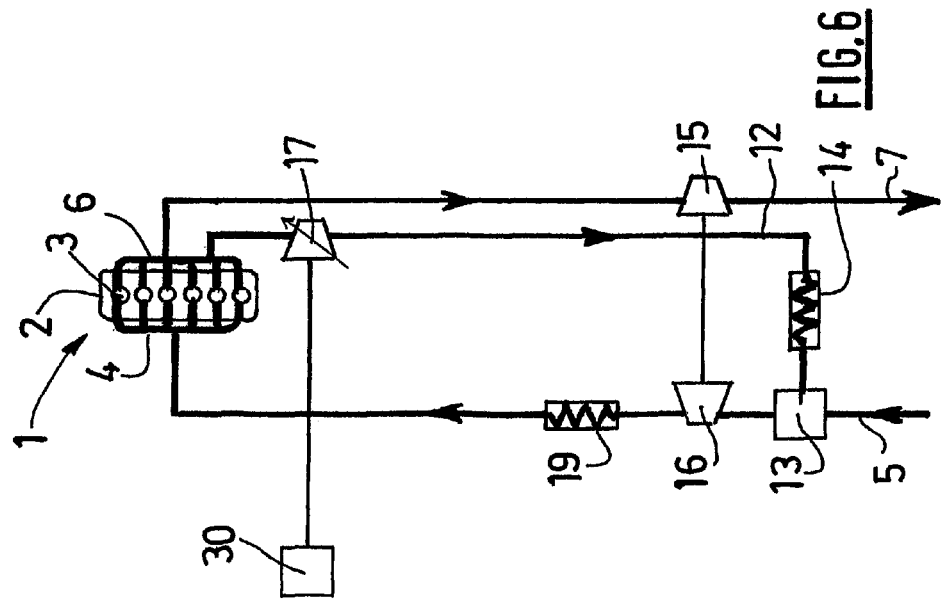

A further embodiment of the invention is shown in FIGS. 6 and 7.

In this embodiment, EGR turbine 17 is not linked to a compressor located on the air intake line, but to another type of energy recovering means 30 which is capable of recovering the energy provided by the turbine. Depending on the vehicle needs, this energy recovering means 30 may comprise:

an energy storage component (such as a battery);

and/or a crankshaft mechanically or electrically connected to turbine 17;

and/or an electrical device connected to turbine 17 (such as an electric motor or an alternator);

and/or any other component capable of directly using the energy provided by turbine 17 or storing this energy for a future user for a use by another device. This embodiment can be very attractive as vehicle electric energy needs tend to grow to power more vehicle electrical equipments such as air conditioning, GPS system etc. For example, the component could provide electricity to an engine accessory such as the oil pump or the water pump, which would help to distribute coolant to EGR cooler, etc.

The mechanical connection may be achieved by means of a viscous coupling or other appropriate coupling.

In the arrangement of FIG. 6, a single turbocharger is provided suitably comprising turbine 15 and compressor 16. The air intake line 5 is equipped with only one cooler (first intake cooler 19), and the EGR mixer 13 is situated upstream from the compressor 16. However, other implementations can be envisaged.

FIG. 7 shows an alternative arrangement where the engine 1 is provided with a two-stage turbocharger:

a low pressure turbocharger comprising turbine 15 and compressor 16;

a high pressure turbocharger comprising an additional turbine 31 located on exhaust line 7 upstream from turbine 15 and a high pressure compressor 32 located downstream from low pressure compressor 16, a first intake cooler 19 being situated between the two compressors 16, 32.

In this arrangement, the EGR mixer 13 may be situated upstream from low pressure compressor 16. However, other implementations can be envisaged (more coolers, different location for EGR mixer, etc.).

It is possible to envisage that the energy recovering means 30 could participate in controlling the EGR rate, in addition to the presence of the variable geometry turbine, if an electric machine is used, by accelerating or decelerating the EGR dedicated turbine.

Figure 8:
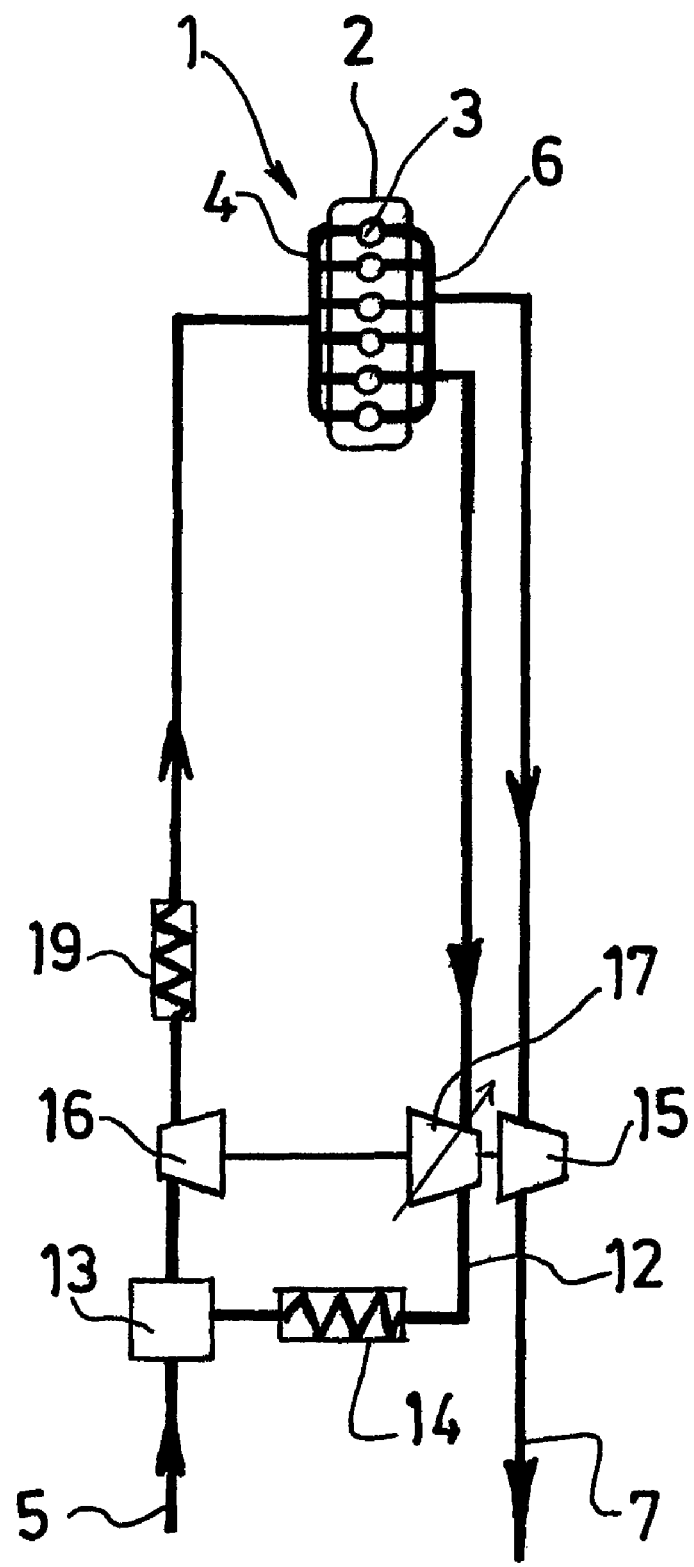
FIG. 8 is a schematic drawing of an internal combustion engine according to a third embodiment of the invention.

FIG. 8 illustrates a further embodiment of the invention whereby the EGR turbine 17 can be directly linked to the shaft of the standard turbocharger. In other words the compressor 16 can be driven by the turbine 15 and by the EGR turbine 17. This embodiment of the invention incorporates a single compressor 16 and two separate turbines 15 and 17; the engine includes two turbine inlet ports: one turbine inlet port, corresponding to the first turbine 15 is dedicated to the standard exhaust system, and the other turbine inlet port, corresponding to the EGR turbine 17, is dedicated to the EGR circuit. In this embodiment of the invention, EGR gas that have been cooled by flowing through the EGR turbine 17, can be further cooled by an EGR cooler 14 before joining the air intake line 5 upstream from the compressor 16. By connecting on the same shaft both the turbine 15 driven by the engine exhaust gas and the EGR turbine 17 driven by EGR gas, an extra driving power is provided to the compressor 16. Overall this embodiment of the invention is less demanding on the vehicle cooling system while making an optimized use of the energy contained in the exhaust gas and in the EGR gas. It can also be envisaged that this latter embodiment of the invention which is provided with a twin-turbine turbocharger could integrate a two stage turbocharged arrangement where said twin-turbine turbocharger would be used in cooperation with a low pressure turbocharger in an arrangement similar the one depicted on FIG. 4.

In this embodiment, it is particularly useful to have a variable geometry EGR turbine. Indeed, in this embodiment, the rotating speeds of the two turbines are directly linked. They are equal, or could be simply linked by a multiplying factor if one of the turbines would be linked to the common shaft through a gear train. Therefore, there being no possible independent adjustment of the speed of the turbine, it is very beneficial to be able to adapt the geometry of the EGR turbine 17 to match turbine speed and EGR flow in order to have the best possible efficiency of the turbine, which translates both in an optimum cooling of the EGR gases and a maximum energy recovery on the compressor side.

Of course, the invention is not restricted to the embodiments described above by way of non-limiting examples, but on the contrary it encompasses all embodiments thereof. Particularly, while, in the above embodiments, the nature of the turbines 15, 21 24 located in the exhaust line 7 has not been discussed, it is of course always possible to choose from a regular turbine or a variable geometry turbine similar to the EGR turbine 17, knowing that regular turbines usually have a better maximum efficiency ratio. Also, the EGR lines 8, 9, 12 can be connected either directly to the exhaust manifold, as shown in FIGS. 2 to 8, or connected to an upstream part of the exhaust line 7, as shown in the prior art at FIG. 1. Moreover, in the shown embodiments of the invention, the EGR line 12 has its inlet connected to the exhaust line upstream of any turbine located on said exhaust line. This feature allows having maximum pressure of the EGR gas, and therefore having the maximum flow of EGR gases whatever the engine operating conditions. Nevertheless, especially in the case of applications requiring less EGR gases, it is possible to have the EGR line inlet branched-off downstream of at least one turbine located in the exhaust line. For example, with an arrangement similar to that of FIG. 7, it would be possible to have the EGR line branched-off between turbines 31 and 15. In an arrangement similar to that of FIG. 4, the same disposition could be applied, although it might require having the corresponding EGR driven compressor 18 located more upstream in the intake line 5, at least upstream of compressor 22, and possibly upstream also of compressor 16.

Also, with the EGR line comprising a turbine, it might be useful to provide means to prevent fouling of the turbine by particles contained in the exhaust fumes coming out of the cylinders. Therefore, it can be provided that such means may be inserted in the EGR line upstream of the EGR turbine, or even in the exhaust line, upstream of the branch-off locations of the EGR line. Such means can comprise a diesel particulate filter operated with periodical recycling, or a catalytic regenerative trap where the particles are burnt through a catalytic process. The latter means may be used thanks to the upstream location, near the exhaust manifold, where the gas temperatures are high enough for the catalytic process.

In the above, it has been described embodiments where the EGR line outlet is connected to the air intake line upstream from at least one compressor. Such a configuration is preferred because the pressure differential makes it possible for EGR gases to flow towards the intake manifold at any engine operating condition, at also allows to take out a maximum of the energy contained in the EGR gases before reintroducing them into the air intake circuit. Nevertheless, the invention can also be implemented with a so-called "short-route" EGR circuit where the EGR line outlet is connected to the air intake line downstream of the compressor(s). Such a configuration has the advantage of not having the risk of fouling the compressors with residues carried by the EGR gases.

The invention claimed is:
1. An internal combustion engine having a plurality of cylinders, comprising:
an air intake line capable of carrying intake air towards the cylinders;
an exhaust line capable of collecting exhaust gas from the cylinders;
an EGR line capable of rerouting a part of the exhaust gas from the exhaust line towards the air intake line;
at least a first turbocharger comprising a first turbine driven by the exhaust gas flowing towards the atmosphere, mechanically linked to a first compressor located on the air intake line;
an EGR turbine located on the EGR line, the EGR turbine being solely driven by the EGR gas flowing in the EGR line; and
an energy recovering means linked to the EGR turbine and capable of recovering the energy provided by the EGR turbine ,wherein the energy recovering means is a second compressor mechanically connected to the EGR turbine and capable of compressing gas flowing from the first compressor outlet towards the cylinders;
wherein the EGR turbine is of the variable geometry type, and the flow of EGR gas is regulated by varying the geometry of the turbine, an inlet of the EGR line is upstream of any turbine located on the exhaust line, and an outlet of the EGR line is connected to the air intake line upstream from at least one compressor in the air intake line.

2. The internal combustion engine according to claim 1, wherein no additional flow regulating valve is provided in the EGR line upstream of the EGR turbine.

3. The internal combustion engine according to claim 1, wherein the second compressor is located on the air intake line, downstream from the first compressor.

4. The internal combustion engine according to claim 1, wherein the air intake line further comprises an additional compressor located downstream from the first compressor.

5. The internal combustion engine according to claim 4, wherein the second compressor is arranged in parallel with the additional compressor located on the air intake line downstream from the first compressor.

6. The internal combustion engine according to claim 1, wherein the EGR line outlet is connected to the air intake line upstream from the first compressor located most upstream of any other compressor in the air intake line.

7. The internal combustion engine according to claim 1, wherein the air intake line further comprises an additional compressor located downstream from the EGR line outlet.

8. The internal combustion engine according to claim 1, wherein the EGR line comprises an EGR cooler downstream of EGR turbine.

9. An internal combustion engine having a plurality of cylinders, comprising:
an air intake line capable of carrying intake air towards the cylinders;
an exhaust line capable of collecting exhaust gas from the cylinders;
an EGR line capable of rerouting a part of the exhaust gas from the exhaust line towards the air intake line;
at least a first turbocharger comprising a first turbine driven by the exhaust gas flowing towards the atmosphere, mechanically linked to a first compressor located on the air intake line;

an EGR turbine located on the EGR line, the EGR turbine being solely driven by the EGR gas flowing in the EGR line;

wherein the EGR turbine is of the variable geometry type, and the flow of EGR gas is regulated by varying, the geometry of the turbine, an inlet of the EGR line is upstream of any turbine located on the exhaust line, and an outlet of the EGR line is connected to the air intake line upstream from at least one compressor in the air intake line, wherein the EGR line outlet is connected to the air intake line downstream from the first compressor located most upstream of any other compressor in the air intake line and upstream from at least one other compressor.

10. The internal combustion engine according to claim 9, wherein no additional flow regulating valve is provided in the EGR line upstream of the EGR turbine.

11. The internal combustion engine according to claim 9, wherein the at least one other compressor linked to the EGR turbine and capable of recovering the energy provided by the EGR turbine, wherein the at least one other compressor mechanically connected to the EGR turbine and capable of compressing gas flowing from the first compressor outlet towards the cylinders.

12. An internal combustion engine having a plurality of cylinders, comprising:

an air intake line capable of carrying intake air towards the cylinders;

an exhaust line capable of collecting exhaust gas from the cylinders:

an EGR line capable of rerouting a part of the exhaust gas from the exhaust line towards the air intake line;

at least a first turbocharger comprising a first turbine driven by the exhaust gas flowing towards the atmosphere, mechanically linked to a first compressor located on the air intake line;

an EGR turbine located on the EGR line, the EGR turbine being solely driven by the EGR gas flowing in the EGR line;

wherein the EGR turbine is of the variable geometry type, and the flow of EGR gas is regulated by varying the geometry of the turbine, an inlet of the EGR line is upstream of any turbine located on the exhaust line, and an outlet of the EGR line is connected to the air intake line upstream from at least one compressor in the air intake line, wherein the exhaust manifold is arranged in two parts, each connected to a corresponding EGR conduit, the two EGR conduits meeting upstream of the EGR turbine.

13. The internal combustion engine according to claim 12, wherein no additional flow regulating valve is provided in the EGR line upstream of the EGR turbine.

14. The internal combustion engine according to claim 12, further comprising an energy recovering means linked to the EGR turbine and capable of recovering the energy provided by the EGR turbine wherein the energy recovering means is a second compressor mechanically connected to the EGR turbine and capable of compressing gas flowing from the first compressor outlet towards the cylinders.

* * * * *